(12) United States Patent
Nagahori et al.

(10) Patent No.: US 12,158,543 B2
(45) Date of Patent: Dec. 3, 2024

(54) SENSOR DEVICE AND HOUSING (71) Applicant: Pioneer Corporation, Tokyo (JP)

(72) Inventors: Yohei Nagahori, Kawagoe (JP); Tsuyoshi Tanaka, Kawagoe (JP); Yuji Yoshida, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 252 days.

(21) Appl. No.: 17/779,527

(22) PCT Filed: Dec. 10, 2020

(86) PCT No.: PCT/JP2020/045989
§ 371 (c)(1),
(2) Date: May 24, 2022

(87) PCT Pub. No.: WO2021/125027
PCT Pub. Date: Jun. 24, 2021

(65) Prior Publication Data
US 2023/0003841 A1   Jan. 5, 2023

(30) Foreign Application Priority Data

Dec. 17, 2019 (JP) ................................ 2019-227006

(51) Int. Cl.
*G01S 7/481* (2006.01)
*G01S 17/06* (2006.01)
(Continued)

(52) U.S. Cl.
CPC .......... *G01S 7/4814* (2013.01); *G01S 7/4817* (2013.01); *G01S 17/06* (2013.01); *G01S 17/88* (2013.01); *G02B 26/10* (2013.01)

(58) Field of Classification Search
CPC ........ G01S 17/06; G01S 17/88; G01S 7/4813; G01S 7/4814; G01S 7/4817; G02B 26/10; G02B 26/105
See application file for complete search history.

(56) References Cited

U.S. PATENT DOCUMENTS 9,964,437 B2   5/2018 Lorenzoni et al.
10,048,120 B2  8/2018 Corrain et al.
(Continued)

FOREIGN PATENT DOCUMENTS

JP   2014190736 A   10/2014
JP   2017-138298 A    8/2017
(Continued)

OTHER PUBLICATIONS

International Search Report of related Application No. PCT/JP2020/045989, mailed Feb. 22, 2021, 2 pages.
(Continued)

*Primary Examiner* — Peter B Kim
(74) *Attorney, Agent, or Firm* — Procopio, Cory, Hargreaves & Savitch LLP (57) ABSTRACT

An optical device (100) has a field of view (F) which enlarges as advancing toward one direction from a predetermined position. A housing (200) includes a transmission unit (210). The transmission unit (210) crosses the field of view (F). The housing (200) accommodates the optical device (100). The transmission unit (210) includes a first side (212) and a second side (214). The second side (214) is located on an opposite side to the first side (212). A width of the transmission unit (210) on a side with the second side (214) is narrower than a width of the transmission unit (210) on a side with the first side (212). The second side (214) of the transmission unit (210) is located closer to the predetermined position in the one direction than the first side (212) of the transmission unit (210).

7 Claims, 4 Drawing Sheets (51) Int. Cl.
    *G01S 17/88*     (2006.01)
    *G02B 26/10*     (2006.01)

(56) References Cited

U.S. PATENT DOCUMENTS

| | | | |
|---|---|---|---|
| 10,078,132 B2 | 9/2018 | Ishikawa et al. | |
| 10,545,223 B2 | 1/2020 | Hayakawa et al. | |
| 10,989,794 B2 | 4/2021 | Ishikawa et al. | |
| 2016/0047902 A1 | 2/2016 | Ishikawa et al. | |
| 2017/0190151 A1* | 7/2017 | Hamano | B32B 17/10788 |
| 2017/0219696 A1 | 8/2017 | Hayakawa et al. | |
| 2017/0322074 A1 | 11/2017 | Corrain et al. | |
| 2017/0322075 A1 | 11/2017 | Lorenzoni et al. | |
| 2019/0056481 A1 | 2/2019 | Ishikawa et al. | |
| 2020/0150243 A1 | 5/2020 | Di Chele et al. | |
| 2020/0348397 A1 | 11/2020 | Yamamoto | |

FOREIGN PATENT DOCUMENTS

| | | | |
|---|---|---|---|
| JP | 2017150858 A | 8/2017 | |
| JP | 2019128236 A | 8/2019 | |
| JP | 2019163988 A | 9/2019 | |
| JP | 2019-535014 A | 12/2019 | |
| WO | 2014/168137 A1 | 10/2014 | |

OTHER PUBLICATIONS

Written Opinion of the International Searching Authority of related Application No. PCT/JP2020/045989, mailed Feb. 22, 2021, 3 pages.
Office Action received in JP Application No. 2021-565524, dated Oct. 3, 2023, in 6 pages (with translation).
Decision of Dismissal of Amendment received in JP Application No. 2021-565524, dated Mar. 12, 2024, in 5 pages (with translation).
Decision of Refusal received in JP Application No. 2021-565524, dated Mar. 12, 2024, in 2 pages (with translation).

* cited by examiner

SENSOR DEVICE AND HOUSING

CROSS-REFERENCE TO RELATED APPLICATIONS

This application is a US national stage application of International Application PCT/JP2020/045989, filed Dec. 10, 2020, and claims priority to Japanese Patent Application No. 2019-227006, filed Dec. 17, 2019, the contents of which are incorporated by reference.

TECHNICAL FIELD

The present invention relates to a sensor device and a housing.

BACKGROUND ART

In recent years, there have been developments in an optical device having a movable reflector such as Micro Electro Mechanical Systems (MEMS) mirror or the like (for example, Light Detection And Ranging (LiDAR) or RAdio Detection And Ranging (RADAR)). The movable reflector of the optical device scans a target such as an object or the like which exists in the outside of the optical device by an electromagnetic wave such as infrared rays or the like.

For example, as described in Patent Document 1, the optical device may be accommodated in the housing in some cases. The optical device of Patent Document 1 includes a light projection unit, a scanning unit, and a light receiving unit. These light projection unit, the scanning unit, and the light receiving unit are accommodated in the housing.

RELATED ART DOCUMENT

Patent Document

[Patent Document 1] Japanese Unexamined Patent Application Publication No. 2019-128236

SUMMARY OF THE INVENTION

Problem to be Solved

It is necessary for a housing for accommodating an optical device to be provided with a transmission unit which transmits an electromagnetic wave emitted from the optical device. It is desirable that the housing is small by various requests regarding a space in which the housing is installed or the like.

A problem to be solved by the present invention is to make a housing for accommodating an optical device small.

Solution to Problem

The invention described in claim 1 is a sensor device including:
  an optical device having a field of view which enlarges as advancing toward one direction from a predetermined position; and
  a housing which includes a transmission unit crossing the field of view and accommodates the optical device,
  in which the transmission unit includes a first side, and a second side located on an opposite side to the first side,
  in which a width of the transmission unit on a side with the second side is narrower than a width of the transmission unit on a side with the first side, and
  in which the second side of the transmission unit is located closer to the predetermined position in the one direction than the first side of the transmission unit.

The invention described in claim 5 is a housing for accommodating an optical device having a field of view which enlarges as advancing toward one direction from a predetermined position, the housing including: a transmission unit crossing the field of view,
  in which the transmission unit includes a first side, and a second side located on an opposite side to the first side,
  in which a width of the transmission unit on a side with the second side is narrower than a width of the transmission unit on a side with the first side, and
  in which the second side of the transmission unit is located closer to the predetermined position in the one direction than the first side of the transmission unit.

DESCRIPTION OF EMBODIMENT

Embodiments of the present invention will be described below by referring to the drawings. Note that in all the drawings, the same constituent elements are given the same reference numerals, and descriptions thereof will not be repeated.

Figure 1:
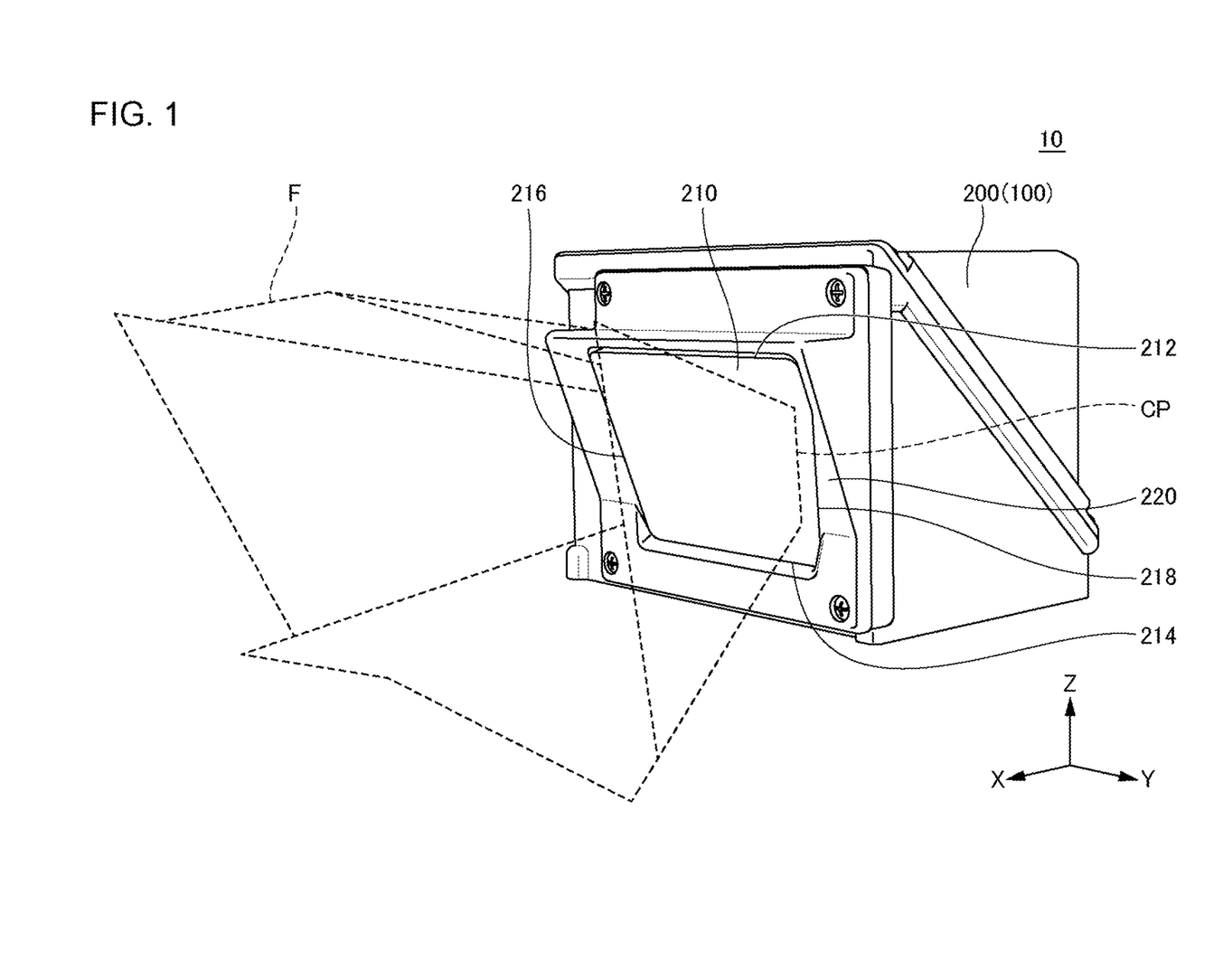
FIG. 1 is a diagram in which a sensor device according to an embodiment is viewed obliquely from front.
Figure 2:
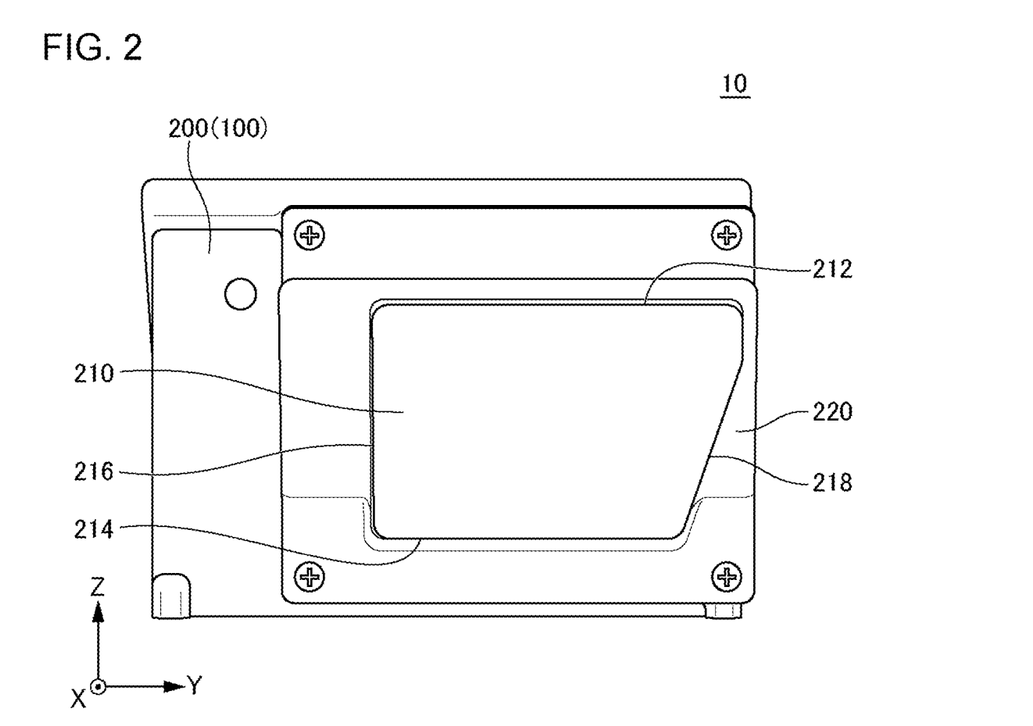
FIG. 2 is a front view of the sensor device illustrated in FIG. 1.
Figure 3:
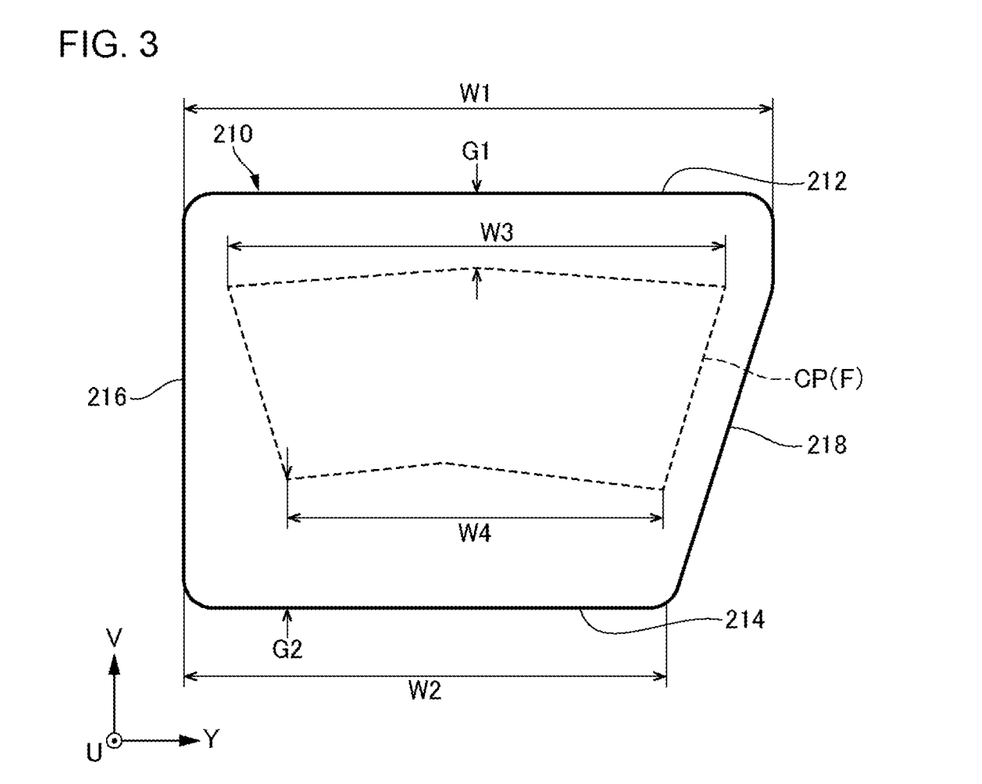
FIG. 3 is a diagram to explain one example of a relationship between a transmission unit and a portion (crossing portion) of a field of view of an optical device crossing the transmission unit when viewed from a direction orthogonal to the transmission unit.
Figure 4:
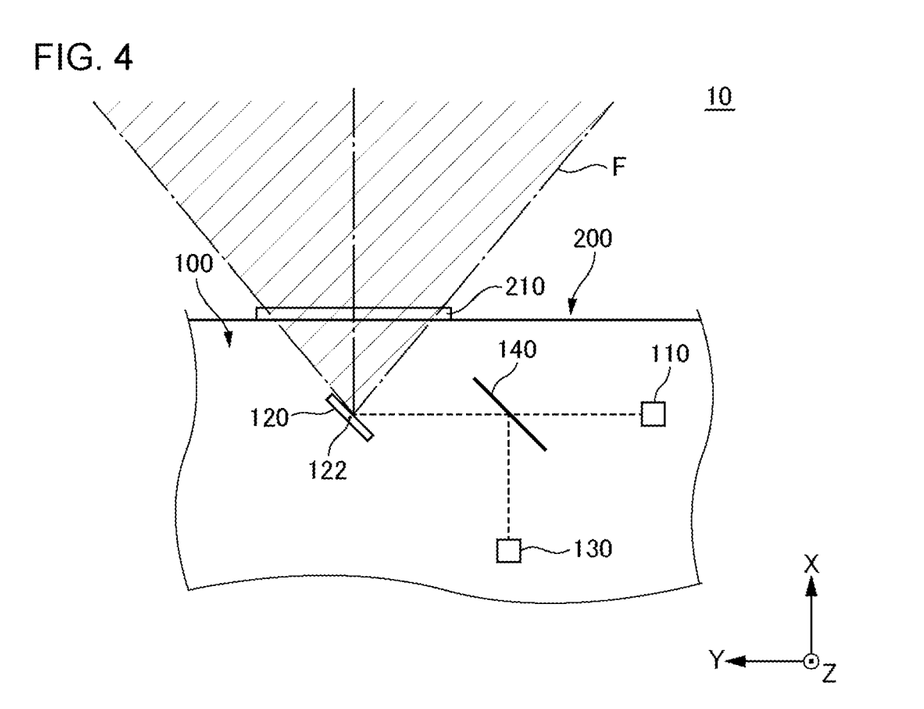
FIG. 4 is a diagram to explain one example of an operation of the optical device accommodated in the housing illustrated in FIG. 1 and FIG. 2.

FIG. 1 is a diagram in which a sensor device 10 according to an embodiment is viewed obliquely from front. FIG. 2 is a front view of the sensor device 10 illustrated in FIG. 1. FIG. 3 is a diagram to explain one example of a relationship between a transmission unit 210 and a portion (crossing portion CP) of a field of view F of an optical device 100 crossing the transmission unit 210 when viewed from a direction orthogonal to the transmission unit 210. FIG. 4 is a diagram to explain one example of an operation of the optical device 100 accommodated in a housing 200 illustrated in FIG. 1 and FIG. 2.

The sensor device 10 includes the optical device 100 and the housing 200.

In each diagram, a first direction X is a front-back direction of the sensor device 10. A positive direction of the first direction X is a front direction of the sensor device 10 (a direction indicated by an arrow indicating the first direction X in FIG. 1 and FIG. 4, a direction indicated by a white circle with a dot indicating the first direction X in FIG. 2 (a direction from a far side to a near side in a page)). A negative direction of the first direction X is a back direction of the sensor device 10 (a direction opposite to a direction indicated by the arrow indicating the first direction X in FIG. 1 and FIG. 4, a direction opposite to the direction indicated by the white circle with the dot indicating the first direction X in FIG. 2 (a direction from the near side to the far side in the page)). A second direction Y crosses the first direction X, specifically, intersects the first direction X at right angles.

The second direction Y is a lateral direction of the sensor device 10. A positive direction of the second direction Y (a direction indicated by an arrow indicating the second direction Y) is a right direction when viewed from the front (the positive direction of the first direction X) of the sensor device 10. A negative direction of the second direction Y (a direction opposite to a direction indicated by the arrow indicating the second direction Y) is a left direction when viewed from the front (the positive direction of the first direction X) of the sensor device 10. A third direction Z crosses both of the first direction X and the second direction Y, specifically, intersects both of the first direction X and the second direction Y at right angles. The third direction Z is a vertical direction of the sensor device 10. A positive direction of the third direction Z (a direction indicated by an arrow indicating the third direction Z in FIG. 1 and FIG. 2, a direction indicated by a white circle with a dot indicating the third direction Z in FIG. 4 (a direction from a far side to a near side in a page)) is an upward direction of the sensor device 10. A negative direction of the third direction Z (a direction opposite to a direction indicated by the arrow indicating the third direction Z in FIG. 1 and FIG. 2, a direction opposite to the direction indicated by the white circle with the dot indicating the third direction Z in FIG. 4 (a direction from a near side to a far side in the page)) is a downward direction of the sensor device 10.

In FIG. 3, a fourth direction U is a direction orthogonal to the transmission unit 210, specifically, orthogonal to a front surface (a surface on a positive direction side of the first direction X) or a rear surface (a surface on a negative direction side of the first direction X) of the transmission unit 210. The fourth direction U may be a direction which is in parallel to, for example, a thickness of the transmission unit 210. The fourth direction U crosses the second direction Y, specifically, intersects the second direction Y at right angles. A positive direction of the fourth direction U (a direction indicated by a white circle with a dot indicating the fourth direction U (a direction from a far side to a near side in a page)) is a direction from the rear surface of the transmission unit 210 (a surface on the negative direction side of the first direction X) to the front surface of the transmission unit 210 (the surface on the positive direction side of the first direction X). The positive direction of the fourth direction U may be, for example, a normal direction of the front surface (the surface on the positive direction side of the first direction X) of the transmission unit 210. A negative direction of the fourth direction U (the direction opposite to the direction indicated by the white circle with the dot indicating the fourth direction U (the direction from the near side to the far side in the page)) is a direction from the front surface of the transmission unit 210 (the surface on the positive direction side of the first direction X) to the rear surface of the transmission unit 210 (the surface on the negative direction side of the first direction X). The negative direction of the fourth direction U may be, for example, a normal direction of the rear surface of the transmission unit 210 (the surface on the negative direction side of the first direction X). A fifth direction V crosses both of the second direction Y and the fourth direction U, specifically, intersects both of the second direction Y and the fourth direction U at right angles. The fifth direction V may be a direction which is in parallel to, for example, the front surface (the surface on the positive direction side of the first direction X) or the rear surface (the surface on the negative direction side of the first direction X) of the transmission unit 210. A positive direction of the fifth direction V (a direction indicated by an arrow indicating the fifth direction V) is a direction from the second side 214 to the first side 212 of the transmission unit 210 described later. A negative direction of the fifth direction V (a direction opposite to the direction indicated by the arrow indicating the fifth direction V) is a direction from the first side 212 to the second side 214 of the transmission unit 210.

The sensor device 10 is explained using FIG. 1 and FIG. 2.

The optical device 100 has the field of view F which enlarges as advancing from a predetermined position (details of the predetermined position will be described later) toward one direction (the positive direction of the first direction X). The housing 200 includes the transmission unit 210. The transmission unit 210 crosses the field of view F. The housing 200 accommodates the optical device 100. The transmission unit 210 includes the first side 212 (top side), the second side 214 (bottom side), a third side 216 (left side), and a fourth side 218 (right side). The second side 214 is located on an opposite side to the first side 212. The third side 216 is located between the first side 212 and the second side 214. The fourth side 218 is located on an opposite side to the third side 216. A width (a width W2 illustrated in FIG. 3 described later) of the transmission unit 210 in the second direction Y on a side with the second side 214 (a lower side of the transmission unit 210 (a negative direction side of the third direction Z)) is narrower than a width (a width W1 shown in FIG. 3 described later) of the transmission unit 210 in the second direction Y on a side with the first side 212 (an upper side of the transmission unit 210 (a positive direction side of the third direction Z)). The second side 214 of the transmission unit 210 is located closer to the predetermined position than the first side 212 of the transmission unit 210 in the one direction (the positive direction of the first direction X). That is, the transmission unit 210 is obliquely inclined with respect to a height direction of the housing 200 (the third direction Z) from the first side 212 of the transmission unit 210 to the second side 214 of the transmission unit 210. Specifically, the transmission unit 210 is obliquely inclined with respect to the height direction of the housing 200 (the third direction Z) toward the back of the sensor device 10 (the negative direction of the first direction X) as advancing toward a lower portion of the sensor device 10 (the negative direction of the third direction Z).

In the present embodiment, a width of a portion (the crossing portion CP) of the field of view F crossing the transmission unit 210 in the second direction Y on a side with the second side 214 of the transmission unit 210 is narrower than a width of the crossing portion CP of the field of view F in the second direction Y or a side with the first side 212 of the transmission unit 210. Therefore, it is allowed to make the width of the transmission unit 210 on the side with the second side 214 (a lower side of the transmission unit 210) shorter than the width of the transmission unit 210 on the side with the first side 212 (the upper side of the transmission unit 210). Therefore, it is possible to make the housing 200 smaller by the same extent that the width of the transmission unit 210 on the side with the second side 214 (the lower side of the transmission unit 210) is made shorter than the width of the transmission unit 210 on the side with the first side 212 (the upper side of the transmission unit 210).

Further in the present embodiment, in the height direction of the housing 200 (the third direction Z), the first side 212 of the transmission unit 210 is located on the upper side (the positive direction side of the third direction Z) than the second side 214 of the transmission unit 210. Therefore, a normal direction of the front surface (the surface on the positive direction side of the first direction X) of the transmission unit 210 is obliquely inclined toward the lower portion of the sensor device 10 (the negative direction of the third direction Z) from a direction to the front of the sensor device 10 (the positive direction of the first direction X). In this case, in comparison with a case where the normal direction of the front surface of the transmission unit 210 (the surface on the positive direction side of the first direction X) is obliquely inclined toward an upper portion of the sensor device 10 (the positive direction of the third direction Z) from the direction to the front of the sensor device 10 (the positive direction of the first direction X), a noise (for example, sunlight) from an obliquely upper space of the sensor device 10 (a direction oblique toward the positive direction of the third direction Z from the positive direction of the first direction X) does not likely to enter into an inside of the housing 200 via the transmission unit 210. Further in the above-mentioned case, in comparison with a case where the normal direction of the front surface of the transmission unit 210 (the surface on the positive direction side of the first direction X) is obliquely inclined toward the upper portion of the sensor device 10 (the positive direction of the third direction Z) from the direction to the front of the sensor device 10 (the positive direction of the first direction X), foreign matters (for example, a drop of water) adhered to the front surface of the transmission unit 210 (the surface on the positive direction side of the first direction X) do not likely to stay on the front surface of the transmission unit 210 (the surface on the positive direction side of the first direction X).

Meanwhile, the first side 212 and the second side 214 of the transmission unit 210 need not be the top side and the bottom side of the transmission unit 210 respectively. For example, the first side 212 and the second side 214 of the transmission unit 210 may be the bottom side and the top side of the transmission unit 210 respectively. Alternately, the first side 212 and the second side 214 of the transmission unit 210 may be sides of both sides of the transmission unit 210 (the left side (a side on the negative direction side of the second direction Y)) and the right side (a side on the positive direction side of the second direction Y)).

The optical device 100 may be removably installed on the housing 200, or may be fixed to the housing 200 in an unremovable way. In a case where the optical device 100 is removably installed on the housing 200, the optical device 100 may be fixed to the housing 200 by, for example, fixtures such as screws or the like. In addition, in this case, the housing 200 may be used such that the optical device 100 is manufactured in a state in which the optical device 100 is not installed on the housing 200 and sold. In a case where the optical device 100 is fixed to the housing 200 in the unremovable way, the optical device 100 may be integrally formed with the housing 200 by joining processing such as, for example, weld or the like.

The predetermined position is a starting point at which the field of view F starts enlarging. Further, the predetermined position is located inside the housing 200. The field of view F is a region in which the optical device 100 can detect a target such as an object or the like. For example, the sensor device 10 can emit an electromagnetic wave such as infrared rays or the like toward any one of directions in the field of view F from the predetermined position.

The field of view F two-dimensionally extends along both of the second direction Y and the third direction Z when viewed from the front of the sensor device 10 (the positive direction of the first direction X). Specifically, when viewed from the front of the sensor device 10 (the positive direction of the first direction X), an upper edge of the field of view F (an edge on the positive direction side of the third direction Z) is inclined toward the lower portion of the sensor device 10 (the negative direction of the third direction Z) as advancing from the center, in the second direction Y, of the upper edge of the field of view F to both sides of the second direction Y. Similarly to the case above, when viewed from the front of the sensor device 10 (the positive direction of the first direction X), an lower edge of the field of view F (an edge on the negative direction side of the third direction Z) is inclined toward the lower portion of the sensor device 10 (the negative direction of the third direction Z) as advancing from the center, in the second direction Y, of the lower edge of the field of view F to both sides of the second direction Y. However, a shape of the field of view F is not limited to this example. For example, when viewed from the front of the sensor device 10 (the positive direction of the first direction X), the upper edge of the field of view F (the edge on the positive direction side of the third direction Z) may also be parallel to the first side 212 of the transmission unit 210. Further, when viewed from the front of the sensor device 10 (the positive direction of the first direction X), the lower edge of the field of view F (the edge on the negative direction side of the third direction Z) may also be parallel to the second side 214 of the transmission unit 210.

Both of the front surface of the transmission unit 210 (the surface on the positive direction side of the first direction X) and the rear surface of the transmission unit 210 (the surface on the negative direction side of the first direction X) in the transmission unit 210 are transparent covers which are flat and parallel. The transmission unit 210 is installed on the housing 200 with, for example, a double-sided tape provided along at least a portion of the first side 212, the second side 214, the third side 216, and the fourth side 218 of the transmission unit 210 on the rear surface of the transmission unit 210 (the surface on the negative direction side of the first direction X). Meanwhile, the transmission unit 210 may be a lens in which at least one of the front surface of the transmission unit 210 (the surface on the positive direction side of the first direction X) and the rear surface of the transmission unit 210 (the surface on the negative direction side of the first direction X) is curved.

The housing 200 includes a frame 220. The frame 220 surrounds the transmission unit 210. A portion of the frame 220 stretching along the first side 212 of the transmission unit 210 (a portion on an upper side (the positive direction side of the third direction Z) of the frame 220) protrudes toward the front of the sensor device 10 (the positive direction side of the first direction X) more than a portion of the frame 220 stretching along the second side 214 of the transmission unit 210 (a portion on a lower side (the negative direction side of the third direction Z) of the frame 220). Specifically, a portion of the frame 220 from the positive direction side of the third direction Z (an upper side) to the center of the third direction Z is obliquely inclined with respect to the height direction of the housing 200 (the third direction Z) toward the back of the sensor device 10 (the negative direction of the first direction X) as advancing to the lower portion of the sensor device 10 (the negative direction of the third direction Z). Further, a portion of the frame 220 on a negative direction side (the lower side) of the third direction Z is parallel to the height direction of the housing 200 (the third direction Z). In this case, it is possible to make the housing 200 small in comparison with a case where a portion from the center of the third direction to the negative direction side of the third direction Z (the lower side) protrudes toward the front of the sensor device 10 (the positive direction of the first direction X) more than the portion according to the present embodiment. However, a shape of the frame 220 is not limited to the shape according to the present embodiment. For example, an entirety of the frame 220, that is, a portion of the frame 220 from the positive direction side of the third direction Z (the upper side) to the negative direction side of the third direction Z (the lower side) may be obliquely inclined with respect to the height direction of the housing 200 (the third direction Z) toward the back of the sensor device 10 (the negative direction of the first direction X) as advancing to the lower portion of the sensor device 10 (the negative direction of the third direction Z). Alternately, the frame 220 need not to be obliquely inclined with respect to the height direction of the housing 200 (the third direction Z), and may be parallel to the height direction of the housing 200 (the third direction Z).

The sensor device 10 is further explained using FIG. 3.

In the present embodiment, the transmission unit 210 has a pentagonal shape with rounded corners. The first side 212 is a top side of this pentagon. The second side 214 is a bottom side of this pentagon. The third side 216 is a left side of this pentagon. The fourth side 218 is right sides (or remaining two sides) of this pentagon. The first side 212 and the second side 214 of the transmission unit 210 are parallel to the second direction Y. The first side 212 and the second side 214 of the transmission unit 210 need not be strictly parallel, and may be substantially parallel. For example, at least one of the first side 212 and the second side 214 of the transmission unit 210 may have an inclination which is equal to or greater than 0 degrees, and equal to or less than 5 degrees with respect to the second direction Y. However, a shape of the transmission unit 210 is not limited to the shape according to the present embodiment.

The first side 212 may be, for example, a side in which at least a portion thereof has an inclination which is equal to or greater than 0 degrees, and less than 45 degrees from a positive direction or a negative direction of the second direction Y toward a positive direction or a negative direction of the fifth direction V. Further, the first side 212 need not linearly stretch, and at least a portion of the first side 212 may be curved. In the present embodiment, the first side 212 is parallel to the second direction Y. However, a shape of the first side 212 is not limited to the shape according to the present embodiment. For example, the first side 212 may be inclined toward the negative direction of the fifth direction V as advancing from the center in the second direction Y of the first side 212 to the both sides of the second direction Y. That is, at least a portion of the first side 212 may be substantially parallel to the upper edge of the crossing portion CP of the field of view F (the edge on the positive direction side of the fifth direction V). For example, the first side 212 may have an inclination which is equal to or greater than 0 degrees, and equal to or less than 5 degrees with respect to the upper edge of the crossing portion CP of the field of view F.

The second side 214 may be, for example, a side in which at least a portion thereof has an inclination which is equal to or greater than 0 degrees, and less than 45 degrees from the positive direction or the negative direction of the second direction Y toward the positive direction or the negative direction of the fifth direction V. Further, the second side 214 need not linearly stretch, and at least a portion of the second side 214 may be curved. In the present embodiment, the second side 214 is parallel to the second direction Y. However, a shape of the second side 214 is not limited to the shape according to the present embodiment. For example, the second side 214 may be inclined toward the negative direction of the fifth direction V as advancing from the center in the second direction Y of the second side 214 to the both sides of the second direction Y. That is, at least a portion of the second side 214 may be substantially parallel to the lower edge of the crossing portion CP of the field of view F (the edge on the negative direction side of the fifth direction V). For example, the second side 214 may have an inclination which is equal to or greater than 0 degrees, and equal to or less than 5 degrees with respect to the lower edge of the crossing portion CP of the field of view F.

The third side 216 may be, for example, a side in which at least a portion thereof has an inclination which is equal to or greater than 0 degrees, and less than 45 degrees from the positive direction or the negative direction of the fifth direction V toward the positive direction or the negative direction of the second direction Y. Further, the third side 216 need not linearly stretch, and at least a portion of the third side 216 may be curved. In the present embodiment, the third side 216 is parallel to the fifth direction V. However, a shape of the third side 216 is not limited to the shape according to the present embodiment. For example, at least a portion of the third side 216 (for example, a portion from the center of the fifth direction V to the negative direction side of the fifth direction V) may be inclined toward the positive direction of the second direction Y as advancing to the negative direction of the fifth direction V. That is, at least a portion of the third side 216 may be substantially parallel to a left edge of the crossing portion CP of the field of view F (the edge on the negative direction side of the second direction Y). For example, the third side 216 may have an inclination which is equal to or greater than 0 degrees, and equal to or less than 5 degrees with respect to the left edge of the crossing portion CP of the field of view F.

The second side 214 may be, for example, a side in which at least a portion thereof has an inclination which is equal to or greater than 0 degrees, and equal to or less than 45 degrees from the positive direction or the negative direction of the fifth direction V toward the positive direction or the negative direction of the second direction Y. Further, the fourth side 218 need not linearly stretch, and at least portion of the fourth side 218 may be curved. In the present embodiment, a portion of the fourth side 218 on the positive direction side of the fifth direction V is parallel to the fifth direction V. Further, a portion of the fourth side 218 from a central portion of the fifth direction V to the negative direction side of the fifth direction V is inclined toward the negative direction of the second direction Y as advancing to the negative direction of the fifth direction V. Therefore, at least a portion of the fourth side 218 (a portion from the center of the fifth direction V to the negative direction side of the fifth direction V) is substantially parallel to a right edge of the crossing portion CP of the field of view F (the edge on the positive direction side of the second direction Y). For example, the fourth side 218 may have an inclination which is equal to or greater than 0 degrees, and equal to or less than 5 degrees with respect to the right edge of the crossing portion CP of the field of view F. However, a shape of the fourth side 218 is not limited to the shape according to the present embodiment. For example, an entirety of the fourth side 218 may be parallel to the fifth direction V.

The width W1 of the transmission unit 210 in the second direction Y on the side with the first side 212 can be defined as, for example, a distance in the second direction Y between a portion between the first side 212 and the third side 216 (a rounded corner between the first side 212 and the third side 216 in FIG. 3) and a portion of between the first side 212 and the fourth side 218 (a rounded corner between the first side 212 and the fourth side 218 in FIG. 3). However, a defining method of the width W1 in the second direction Y on the side with the first side 212 of the transmission unit 210 is not limited to this example.

The width W2 of the transmission unit 210 in the second direction Y on the side with the second side 214 can be defined as, for example, a distance in the second direction Y between a portion between the second side 214 and the third side 216 (a rounded corner between the second side 214 and the third side 216 in FIG. 3) and a portion between the second side 214 and the fourth side 218 (a rounded corner between the second side 214 and the fourth side 218 in FIG. 3). However, a defining method of the width W2 of the transmission unit 210 in the second direction Y on the side with the second side 214 is not limited to this example.

From a view point of causing an entirety of the crossing portion CF of the field of view F to cross the transmission unit 210 even when actual positions of the transmission unit 210 and the field of view F are deviated from designed positions of the transmission unit 210 and the field of view F by, for example, tolerance, it is possible to make a distance G1 in the fifth direction V between an end of the transmission unit 210 on the side with the first side 212 (the positive direction side of the fifth direction V) in the fifth direction V and an end of the crossing portion CF of the field of view F on the side with the first side 212 (the positive direction side of the fifth direction V) in the fifth direction V, for example, equal to or greater than 10% of a length of the transmission unit 210 in the fifth direction V. From the same point of view, it is possible to make a distance G2 in the fifth direction V between an end of the transmission unit 210 on the side with the second side 214 (the negative direction side of the fifth direction V) in the fifth direction V and an end of the crossing portion CP of the field of view F on the side with the second side 214 (the negative direction side of the fifth direction V) in the fifth direction V, for example, equal to or greater than 20% of the length of the transmission unit 210 in the fifth direction V. Further, from a view point of making the length of the transmission unit 210 in the fifth direction V short, it is possible to make the distance G1 in the fifth direction V between the end of the transmission unit 210 on the side with the first side 212 (the positive direction side of the fifth direction V) in the fifth direction V and the end of the crossing portion CP of the field of view F on the side with the first side 212 (the positive direction side of the fifth direction V) in the fifth direction V, for example, equal to or less than 20% of the length of the transmission unit 210 in the fifth direction V. From the same point of view, it is possible to make the distance G2 in the fifth direction V between the end of the transmission unit 210 on the side with the second side 214 (the negative direction side of the fifth direction V) in the fifth direction V and the end of the crossing portion CP of the field of view F on the side with the second side 214 (the negative direction side of the fifth direction V) in the fifth direction V, for example, equal to or less than 30% of the length of the transmission unit 210 in the fifth direction V.

From a view point of causing the entirety of the crossing portion CP of the field of view F to cross the transmission unit 210 even when the actual positions of the transmission unit 210 and the field of view F are deviated from the designed positions of the transmission unit 210 and the field of view F by, for example, tolerance, it is possible to make the width W1 of the transmission unit 210 in the second direction Y on the side with the first side 212 (the positive direction side of the fifth direction V), for example, equal to or greater than 110% of a width W3 of the crossing portion CP of the field of view F in the second direction Y on the side with the first side 212 (the positive direction side of the fifth direction V). From the same point of view, it is possible to make the width W2 of the transmission unit 210 in the second direction Y on the side with the second side 214 (the negative direction side of the fifth direction V), for example, equal to or greater than 110% of a width W4 of the crossing portion CP of the field of view F in the second direction Y on the side with the second side 214 (the negative direction side of the fifth direction V). Further, from a view point of making a length of the transmission unit 210 in the second direction Y short, it is possible to make the width W1 of the transmission unit 210 in the second direction Y on the side with the first side 212 (the positive direction side of the fifth direction V), for example, equal to or less than 120% of the width W3 of the crossing portion CP of the field of view F in the second direction on the side with the first side 212 (the positive direction side of the fifth direction V). From the same point of view, is possible to make the width W2 of the transmission unit 210 in the second direction Y on the side with the second side 214 (the negative direction side of the fifth direction V), for example, equal to or less than 120% of the width W4 of the crossing portion CP of the field of view in the second direction Y on the side with the second side 214 (the negative direction side of the fifth direction V).

Details of the sensor device 10 are explained using FIG. 4.

The optical device 100 includes a transmitting unit 110, a movable reflector 120, a receiving unit 130, and a beam splitter 140. In FIG. 4, the transmitting unit 110, the movable reflector 120, the receiving unit 130, and the beam splitter 140 are schematically located in one plane which is parallel to both of the first direction X and the second direction Y. However, in an actual layout, the transmitting unit 110, the movable reflector 120, the receiving unit 130, and the beam splitter 140 need not be located in one plane which is parallel to both of the first direction X and the second direction Y, or may be located in one plane which is parallel to both of the first direction X and the second direction Y.

In FIG. 4, electromagnetic waves propagating the transmitting unit 110, the movable reflector 120, the receiving unit 130, and the beam splitter 140 are indicated by broken lines.

The transmitting unit 110 transmits an electromagnetic wave. In one example, the electromagnetic wave transmitted by the transmitting unit 110 is light, specifically, infrared rays. However, the electromagnetic wave transmitted by the transmitting unit 110 may be light having a wavelength different from a wavelength of the infrared rays (for example, visible rays or ultraviolet rays), or may be an electromagnetic wave having a wavelength different from a wavelength of the light (for example, a radio wave). In one example, the transmitting unit 110 transmits a pulse wave. However, the transmitting unit 110 may transmit a continuous wave (CW). In one example, the transmitting unit 110 is an element (for example, a laser diode (LD)) which can convert electric energy (for example, an electric current) into an electromagnetic wave.

The electromagnetic wave transmitted from the transmitting unit 110 passes through the beam splitter 140 and becomes incident on the movable reflector 120, and is reflected by the movable reflector 120. The movable reflector 120 is, for example, Micro Electro Mechanical Systems (MEMS) mirror. The movable reflector 120 is located at the predetermined position.

The electromagnetic wave reflected by the movable reflector 120 passes through the transmission unit 210 and is emitted toward the outside of the sensor device 10. The electromagnetic wave emitted toward the outside of the sensor device 10 becomes incident on a target (not shown in FIG. 4) such as an object or the like which exists in the outside of the sensor device 10, and is reflected or scattered by the target. The electromagnetic wave reflected or scattered by the target passes through the transmission unit 210 and becomes incident on the movable reflector 120. The electromagnetic wave which becomes incident on the movable reflector 120 goes through reflection by the movable reflector 120 and reflection by the beam splitter 140 in this order, and becomes incident on the receiving unit 130. The receiving unit 130 receives the electromagnetic wave incident on the receiving unit 130. In one example, the receiving unit 130 is an element (for example, an avalanche photo diode (APD)) which can convert an electromagnetic wave into electric energy (for example, an electric current).

The sensor device 10 is, for example, Light Detection And Ranging (LiDAR). In one example, the sensor device 10 measures a distance between the sensor device 10 and the target such as the object or the like which exists in the outside of the sensor device 10 based on Time of Flight (ToF). In this example, the sensor device 10 calculates the above-mentioned distance based on a difference between time (for example, time at which the electromagnetic wave is transmitted from the transmitting unit 110) at which the electromagnetic wave is transmitted from the sensor device 10 and time (for example, time at which an electromagnetic wave is received by the receiving unit 130) at which the electromagnetic wave, which is transmitted from the sensor device 10 and reflected or scattered by a target existing in the outside of the sensor device 10, is received by the sensor device.

Viewed from the positive direction of the third direction Z, the field of view F extends as advancing toward the front (the positive direction of the first direction X) of the sensor device 10. Specifically, the movable reflector 120 is capable of swinging around an axis 122. The axis 122 extends along the third direction Z. The field of view F of the optical device 100 is determined in accordance with the maximum swinging angle of the movable reflector 120. Viewed from the positive direction of the third direction Z, when the movable reflector 120 swings counterclockwise by the maximum swinging angle of the optical device 100, the electromagnetic wave transmitted by the transmitting unit 110 and reflected by the movable reflector 120 passes through one end portion of the field of view F (a left-hand end portion of the field of view F in FIG. 4). Viewed from the positive direction of the third direction Z, when the movable reflector 120 swings clockwise by the maximum swinging angle of the optical device 100, the electromagnetic wave transmitted by the transmitting unit 110 and reflected by the movable reflector 120 passes through another end portion on an opposite side to the one end portion of the field of view F (a right-hand end portion of the field of view F in FIG. 4). Viewed from the positive direction of the third direction Z, when a swinging angle of the movable reflector 120 is 0 degrees, the electromagnetic wave transmitted from the transmitting unit 110 and reflected by the movable reflector 120 passes through the center of the field of view F.

The movable reflector 120 is also capable of swinging around an axis (not shown) crossing both of the one direction (the positive direction of the first direction X) and a stretching direction (the third direction Z) of the axis 122, specifically, stretching along a direction (the second direction Y) orthogonal to the both. Therefore, when viewed from the positive direction or the negative direction of the second direction Y, the field of view F extends as advancing toward the front (the positive direction of the first direction X) of the sensor device 10.

In the present embodiment, the optical device 100 is a coaxial type LiDAR. That is, an axis passed through by the electromagnetic wave emitted by the optical device 100 (the electromagnetic wave emitted toward the outside of the optical device 100 by the movable reflector 120) and axis passed through by the electromagnetic wave returning to the optical device 100 (the electromagnetic wave which is emitted from the optical device 100, reflected or scattered by the target which exists in the outside of the optical device 100, and becomes incident on the movable reflector 120) match. However, the optical device 100 may be a biaxial type LiDAR. That is, the optical device 100 need not include the movable reflector 120. In this case, the axis passed through by the electromagnetic wave emitted from the optical device 100 and the axis passed through by the electromagnetic wave returning to the optical device 100 (the electromagnetic wave which is emitted from the optical device 100, reflected or scattered by the target which exists in the outside of the optical device 100, and becomes incident on the movable reflector 120) become shifted from each other.

Hitherto, the embodiment is described with reference to the drawings. However, these are just examples of the present invention, and various other configurations may be employed.

For example, in the present embodiment, the field of view F of the optical device 100 is a field of view of a light scanning device such as a LiDAR or the like. However, the field of view F of the optical device 100 may be a field of view of an image pickup device such as a camera or the like.

This application claims priority from Japanese Patent. Application No. 2019-227006, filed on Dec. 17, 2019, the disclosure of which is incorporated by reference in its entirety.

REFERENCE SIGNS LIST 10 sensor device
100 optical device
110 transmitting unit
120 movable reflector
122 axis
130 receiving unit
140 beam splitter
200 housing
210 transmission unit
212 first side
214 second side
216 third side
218 fourth side
220 frame
CP crossing portion
F field of view
U fourth direction
V fifth direction
X first direction
Y second direction
Z third direction

The invention claimed is:
1. A sensor device comprising:
an optical device having a field of view which enlarges as advancing toward one direction from a predetermined position; and a housing which comprises a transmission unit crossing the field of view and accommodates the optical device, wherein the transmission unit includes a first side, a second side located on an opposite side to the first side, a third side crossing the first side and the second side, and a fourth side located on an opposite side to the third side, wherein a width of the transmission unit on a side with the second side is narrower than a width of the transmission unit on a side with the first side, wherein the second side of the transmission unit is located closer to the predetermined position in the one direction than the first side of the transmission unit, wherein at least a part of the first side is substantially parallel to a first edge of a crossing portion of the field of view and the transmission unit, wherein at least a part of the second side is substantially parallel to a second edge of the crossing portion, the second edge being located on an opposite side to the first edge, wherein at least a part of the third side is substantially parallel to a third edge of the crossing portion, the third edge crossing the first edge and the second edge, and wherein at least a part of the fourth side is substantially parallel to a fourth edge of the crossing portion, the fourth edge being located on an opposite side to the third edge.

2. The sensor device according to claim 1, wherein the optical device includes a movable reflector which is capable of swinging.

3. The sensor device according to claim 1, wherein the transmission unit crosses an entirety of the field of view.

4. The sensor device according to claim 1, wherein at least one of a front surface of the transmission unit and a rear surface of the transmission unit is curved.

5. The sensor device according to claim 1, wherein the transmission unit is a lens in which at least one of a front surface of the transmission unit and a rear surface of the transmission unit is curved.

6. The sensor device according to claim 1, wherein at least a portion of the first side of the transmission unit is curved, and wherein at least a portion of the second side of the transmission unit is curved.

7. A sensor device, comprising:

an optical device having a field of view which enlarges as advancing toward one direction from a predetermined position; and a housing which comprises a transmission unit crossing the field of view and accommodates the optical device, wherein the transmission unit includes a first side, a second side located on an opposite side to the first side, a third side crossing the first side and the second side, and a fourth side located on an opposite side to the third side, wherein a width of the transmission unit on a side with the second side is narrower than a width of the transmission unit on a side with the first side, wherein the second side of the transmission unit is located closer to the predetermined position in the one direction than the first side of the transmission unit, wherein at least one of a front surface of the transmission unit and a rear surface of the transmission unit is curved, wherein at least a part of the first side is substantially parallel to a first edge of a crossing portion of the field of view and the transmission unit, wherein at least a part of the second side is substantially parallel to a second edge of the crossing portion, the second edge being located on an opposite side to the first edge, wherein at least a part of the third side is substantially parallel to a third edge of the crossing portion, the third edge crossing the first edge and the second edge, wherein at least a part of the fourth side is substantially parallel to a fourth edge of the crossing portion, the fourth edge being located on an opposite side to the third edge, and wherein the first side of the transmission unit is located below the second side of the transmission unit in a height direction of the housing.

* * * * *